United States Patent
Smith et al.

(10) Patent No.: US 7,198,409 B2
(45) Date of Patent: Apr. 3, 2007

(54) FIBER OPTIC CONNECTOR HOLDER AND METHOD

(75) Inventors: Trevor D. Smith, Eden Prairie, MN (US); Thomas C. Tinucci, Chaska, MN (US); Cindy S. Walters, Prior Lake, MN (US); James W. Conroy, Prior Lake, MN (US); Joel B. Douglas, Hutchinson, MN (US); Kathleen M. Barnes, Golden Valley, MN (US); Marlon E. Holmquist, Gibbon, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/610,325

(22) Filed: Jun. 30, 2003

(65) Prior Publication Data

US 2004/0264873 A1 Dec. 30, 2004

(51) Int. Cl.
*G02B 6/36* (2006.01)

(52) U.S. Cl. .......................................... 385/53
(58) Field of Classification Search ................... 385/53, 385/58, 70
See application file for complete search history.

(56) References Cited

U.S. PATENT DOCUMENTS

| | | | | |
|---|---|---|---|---|
| 4,736,100 A | * | 4/1988 | Vastagh ................. | 250/227.11 |
| 4,995,688 A | | 2/1991 | Anton et al. .................... | 385/53 |
| 5,073,042 A | | 12/1991 | Mulholland et al. .......... | 385/69 |
| 5,076,688 A | * | 12/1991 | Bowen et al. ............. | 356/73.1 |
| 5,142,598 A | * | 8/1992 | Tabone ......................... | 385/78 |

(Continued)

FOREIGN PATENT DOCUMENTS

| | | |
|---|---|---|
| EP | 0 788 002 A1 | 8/1997 |
| EP | 0 871 047 | 10/1998 |
| EP | 0 975 180 | 1/2000 |
| EP | 1 045 267 A1 | 10/2000 |
| JP | 63-229409 | 9/1988 |
| WO | WO 98/53347 | 11/1998 |
| WO | WO 00/75706 | 12/2000 |
| WO | WO 02/103429 | 12/2002 |

OTHER PUBLICATIONS

Brochure from Amphenol Corp. entitled "Amphenol® 954 Series one piece SC Connector," 2 pgs. (1990).
AMP Inc. catalog entitled "Fiber Optic Products," front and back covers and p. 59, (4 pgs.) (©1991).
HRS catalog entitled "Optical Fibre Connectors," front and back covers and pp. 16, 17, and 49 (5 pages) (Mar. 1991).

(Continued)

*Primary Examiner*—Javaid H. Nasri
(74) *Attorney, Agent, or Firm*—Merchant & Gould P.C.

(57) ABSTRACT

The present invention relates to a fiber optic connector holder sized to fit within an opening for mounting a fiber optic adapter. The fiber optic connector holder is configured to permit a fiber optic connector with a dust cap positioned about a ferrule and a polished end face of an optical fiber held by the ferrule to be inserted within and releasably held by the connector holder. The present invention further relates to a system for holding fiber optic connectors including a fiber optic connector holder mounted within an opening in a bulkhead for mounting a fiber optic adapter. The fiber optic connector holder is configured to receive a fiber optic connector with a dust cap mounted about a ferrule and polished end face of an optical fiber held by the ferrule. The present invention also relates to a method of holding an optical fiber connector to a bulkhead, when the fiber optic connector includes a dust cap mounted about a ferrule and a polished end face of an optical fiber held by the ferrule.

31 Claims, 8 Drawing Sheets

U.S. PATENT DOCUMENTS

| | | | |
|---|---|---|---|
| 5,214,735 A | 5/1993 | Henneberger et al. | 385/136 |
| 5,233,674 A | 8/1993 | Vladic | 385/56 |
| 5,274,729 A | 12/1993 | King et al. | 385/134 |
| 5,317,663 A | 5/1994 | Beard et al. | 385/70 |
| 5,333,221 A | 7/1994 | Briggs et al. | 385/70 |
| 5,333,222 A | 7/1994 | Belenkiy et al. | 385/70 |
| 5,359,688 A | 10/1994 | Underwood | 385/70 |
| 5,408,557 A | 4/1995 | Hsu | 385/72 |
| 5,448,015 A | 9/1995 | Jamet et al. | 174/68.3 |
| 5,497,444 A | 3/1996 | Wheeler | 385/135 |
| 5,542,015 A | 7/1996 | Hultermans | 385/60 |
| 5,647,043 A | 7/1997 | Anderson et al. | 385/78 |
| 5,774,612 A | 6/1998 | Belenkiy et al. | 385/72 |
| 5,825,955 A | 10/1998 | Ernst et al. | 385/79 |
| 5,883,995 A | 3/1999 | Lu | 385/60 |
| 5,930,425 A | 7/1999 | Abel et al. | 385/53 |
| 5,956,444 A * | 9/1999 | Duda et al. | 385/53 |
| 6,027,252 A | 2/2000 | Erdman et al. | 385/76 |
| 6,044,193 A | 3/2000 | Szentesi et al. | 385/134 |
| 6,079,881 A * | 6/2000 | Roth | 385/76 |
| 6,149,315 A | 11/2000 | Stephenson | 385/60 |
| 6,160,946 A | 12/2000 | Thompson et al. | 385/134 |
| 6,188,687 B1 | 2/2001 | Mussman et al. | 370/388 |
| 6,188,825 B1 * | 2/2001 | Bandy et al. | 385/134 |
| 6,208,796 B1 | 3/2001 | Williams Vigliaturo | 385/135 |
| 6,227,717 B1 * | 5/2001 | Ott et al. | 385/53 |
| 6,234,683 B1 | 5/2001 | Waldron et al. | 385/78 |
| 6,240,229 B1 | 5/2001 | Roth | 385/53 |
| 6,278,829 B1 | 8/2001 | BuAbbud et al. | 385/135 |
| RE37,489 E | 1/2002 | Anton et al. | 385/53 |
| 6,347,888 B1 * | 2/2002 | Puetz | 385/53 |
| 6,363,200 B1 | 3/2002 | Thompson et al. | 385/135 |
| 6,411,767 B1 | 6/2002 | Burrous et al. | 385/135 |
| 6,424,781 B1 | 7/2002 | Puetz et al. | 385/135 |
| 6,425,694 B1 * | 7/2002 | Szilagyi et al. | 385/76 |
| 6,431,762 B1 * | 8/2002 | Taira et al. | 385/56 |
| 6,434,313 B1 | 8/2002 | Clapp, Jr. et al. | 385/135 |
| 6,452,925 B1 | 9/2002 | Sistanizadeh et al. | 370/352 |
| 6,453,033 B1 | 9/2002 | Little et al. | 379/219 |
| 6,464,402 B1 * | 10/2002 | Andrews et al. | 385/53 |
| 6,480,487 B1 | 11/2002 | Wegleitner et al. | 370/354 |
| 6,483,977 B2 | 11/2002 | Battey et al. | 385/135 |
| 6,496,640 B1 | 12/2002 | Harvey et al. | 385/135 |
| 6,539,147 B1 | 3/2003 | Mahony | 385/24 |
| 6,539,160 B2 | 3/2003 | Battey et al. | 385/135 |
| 6,542,688 B1 | 4/2003 | Battey et al. | 385/135 |
| 6,554,485 B1 * | 4/2003 | Beatty et al. | 385/72 |
| 6,577,595 B1 | 6/2003 | Counterman | 370/230 |
| 6,760,531 B1 | 7/2004 | Solheid et al. | |
| 6,792,191 B1 | 9/2004 | Clapp, Jr. et al. | |
| 2002/0034290 A1 | 3/2002 | Pershan | 379/207.02 |
| 2005/0002633 A1 | 1/2005 | Solheid et al. | 385/135 |

OTHER PUBLICATIONS

AT&T Network Systems catalog entitled "Fiber Optic Products Innovation for wide ranging applications," front and back covers and pp. 6–1 through 6–16 (18 pages) (©1995).

Iwano, S. et al., "MU–type Single Fiber Connector System," *NTT Review*, vol. 9, No. 2, pp. 63–71 (Mar. 1997).

Sugita, E. et al., "SC–Type Single–Mode Optical Fiber Connectors," *Journal of Lightwave Technology*, vol. 7, No. 11, pp. 1689–1696 (Nov. 1989).

ADC Telecommunications, Inc.'s 6th Edition of Next Generation Frame (NGF) Product Family Ordering Guide; front cover, Table of Contents, pp. 1–41, and back cover; revised Feb. 2003, Item No. 820.

ADC Telecommunications, Inc.'s Fiber Optic, Cable Assemblies and Accessories Brochure; front cover, Table of Contents, pp. 1–23, and back cover, revised Apr. 2003, Item No. 100300.

ADC Telecommunications, Inc.'s OMX™ 600, Optical Distribution Frame Brochure; front cover, Table of Contents, pp. 1–14, and back cover, revised Feb. 2001, Item No. 854.

ADC Telecommunications, Inc's Outside Plant, Fiber Cross–Connect Solutions Products Brochure; front cover, Table of Contents, pp. 1–48, and back cover.; revised Jun. 2002, Item No. 1047.

NTT Int'l Fiber Termination Module (FTM) & Premises Optical Distribution Cabinets (PODC) product brochure, 3 pages, undated.

\* cited by examiner

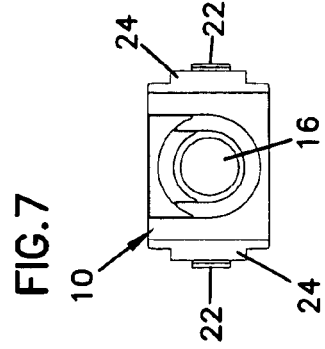
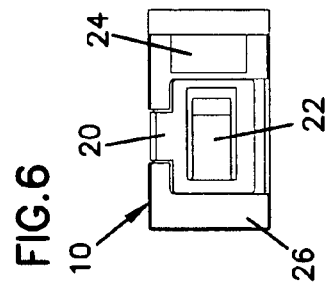
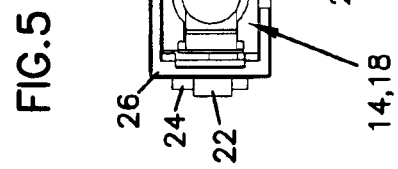
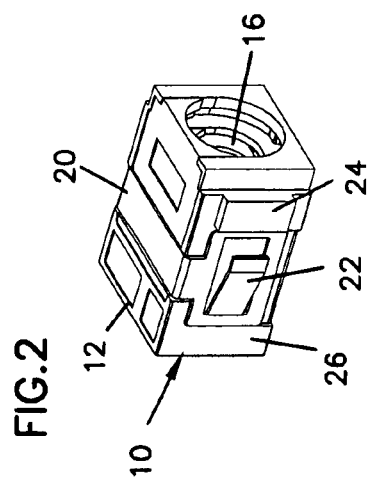
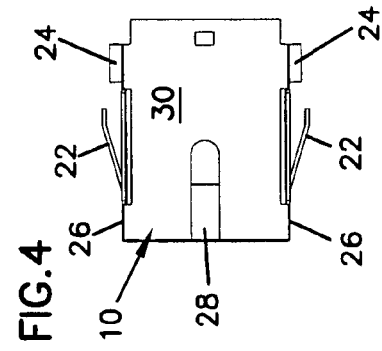
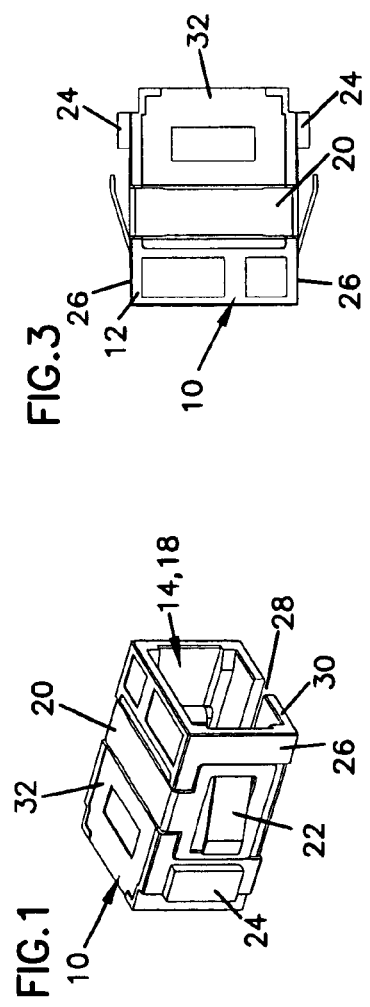

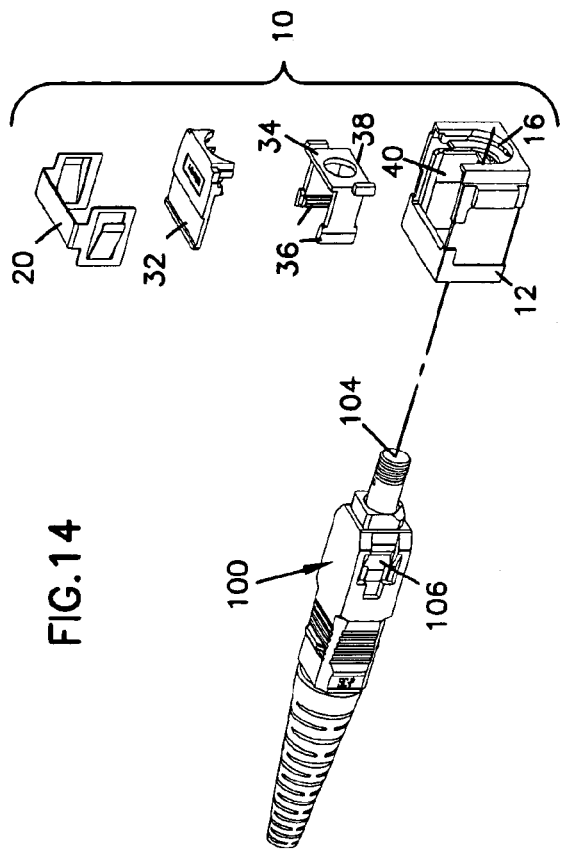
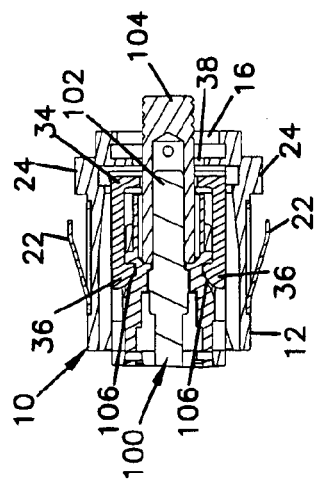
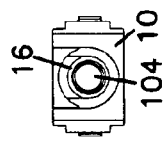
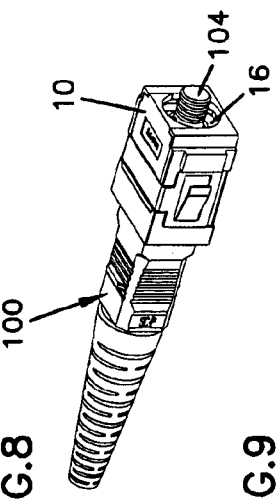
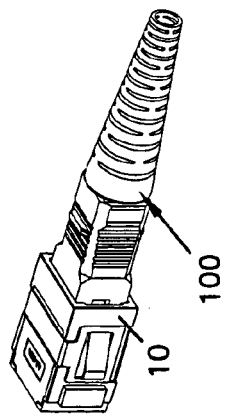
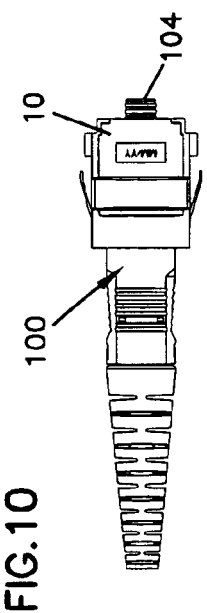
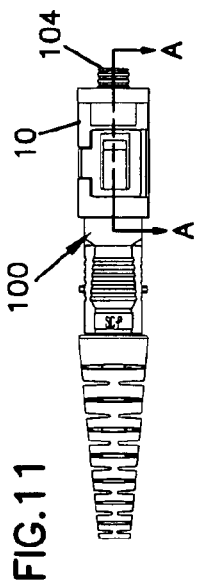

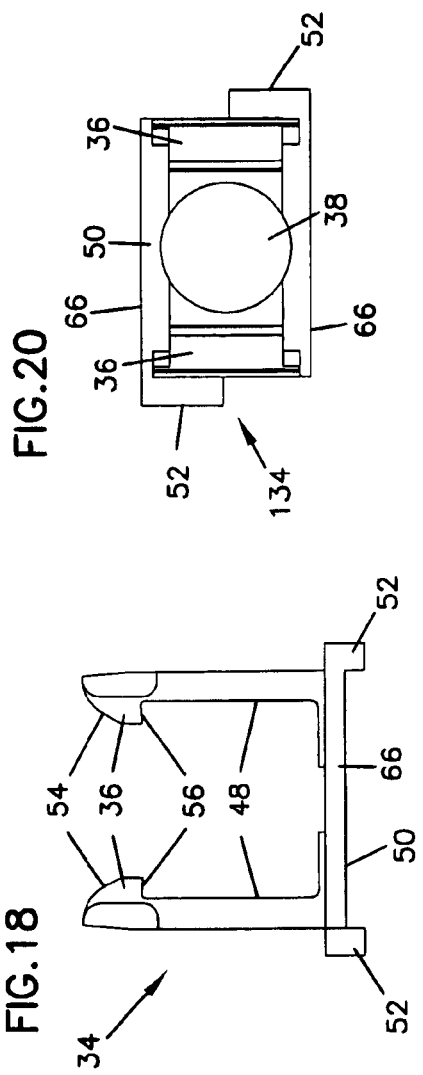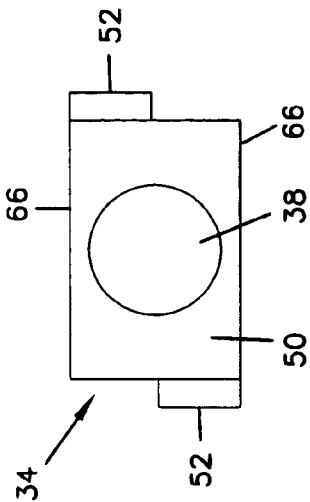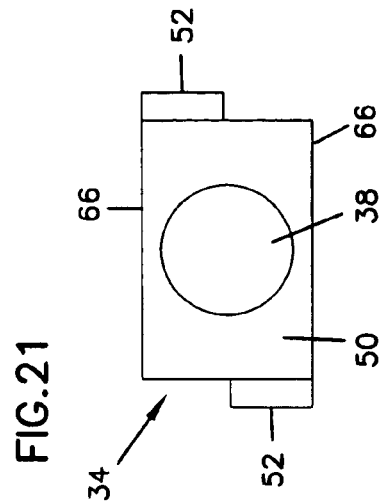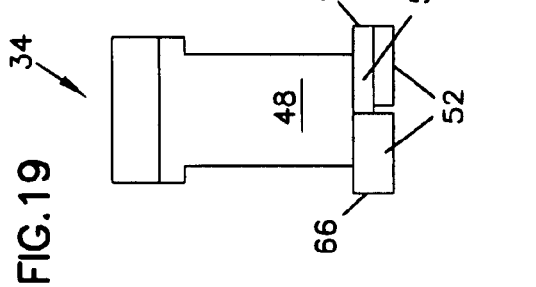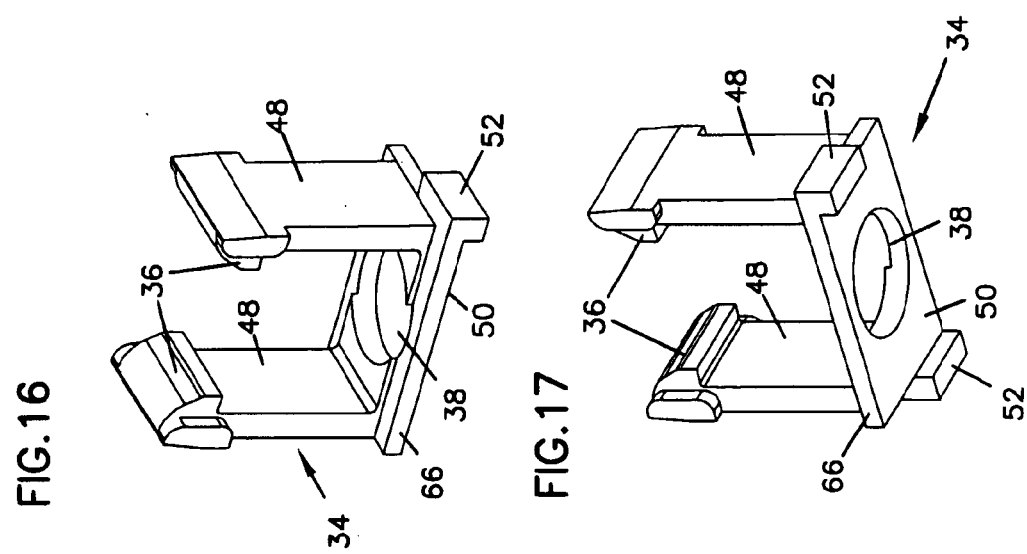

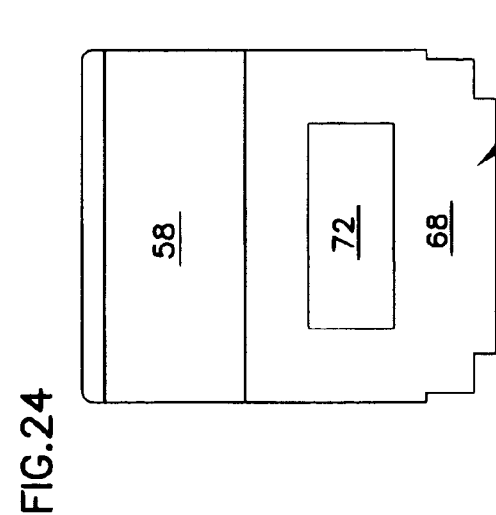
FIG.22
FIG.23
FIG.24
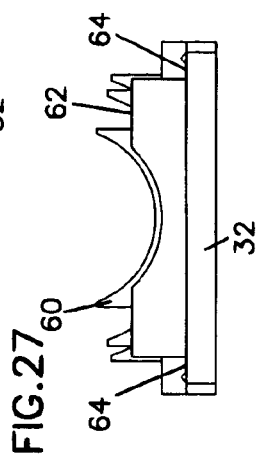
FIG.27
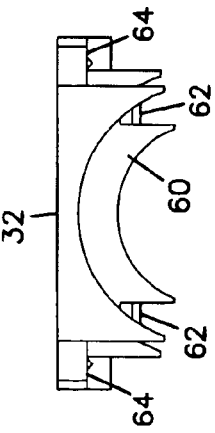
FIG.28
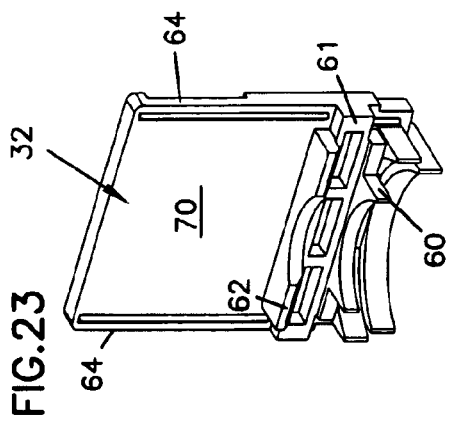
FIG.25
FIG.26
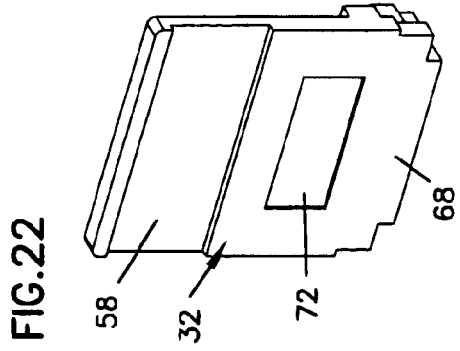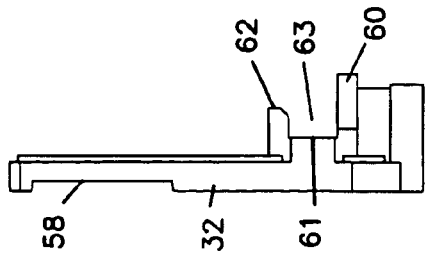

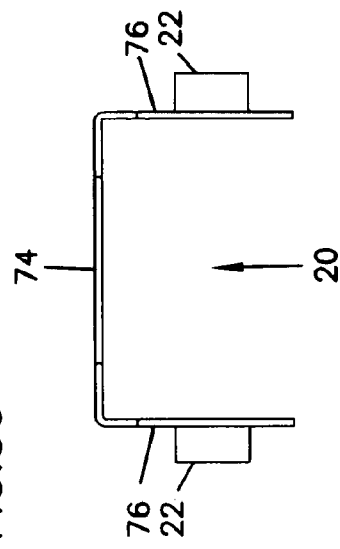
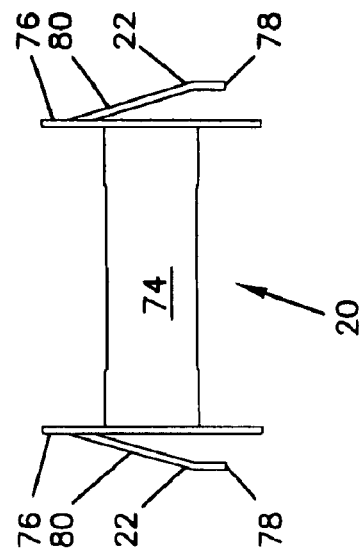
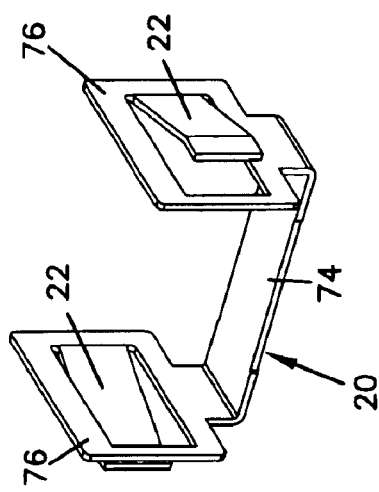
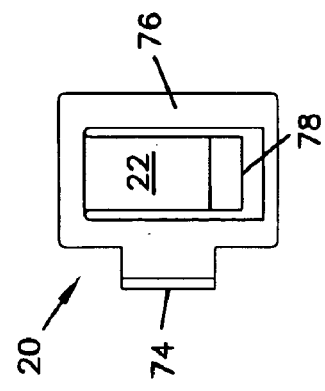

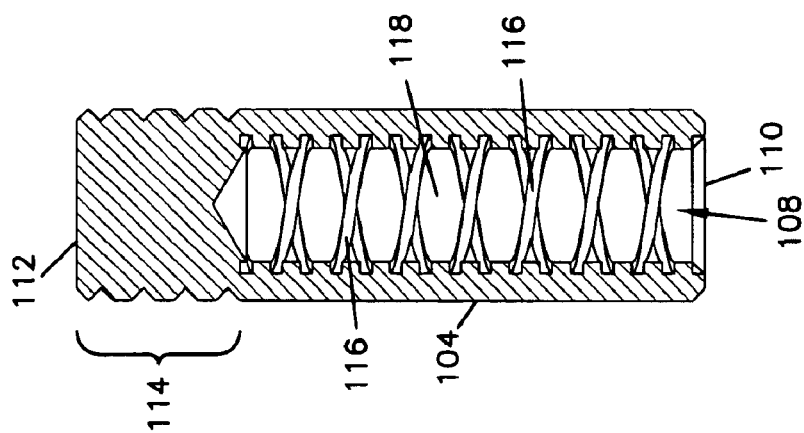
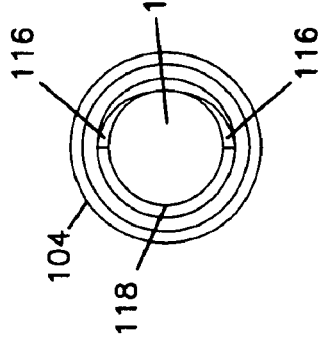
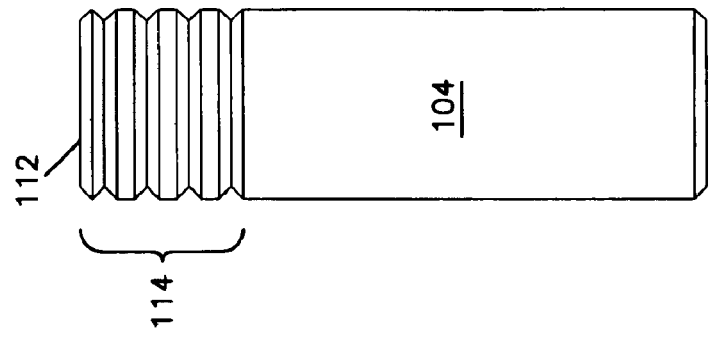
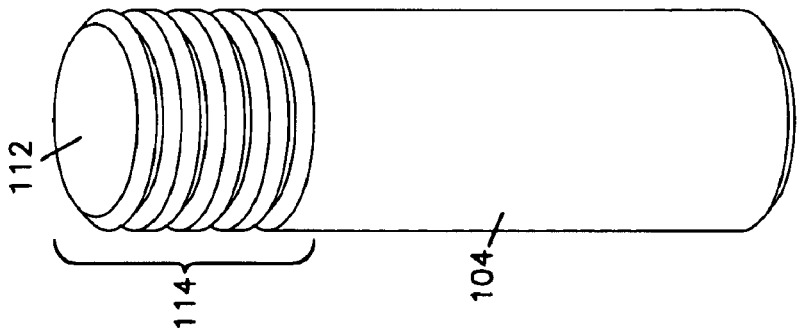

FIBER OPTIC CONNECTOR HOLDER AND METHOD

FIELD OF THE INVENTION

The present invention generally relates to holders for fiber optic connectors and more specifically relates to holders for fiber optic connectors which are protected by dust caps.

BACKGROUND OF THE INVENTION

Fiber optic connectors include a polished end face, typically held by a ferrule, which permits positioning of the optical fiber held by the connector to receive and transmit signals another optical fiber or optical light source. It is desirable to keep these polished end faces as free of contaminants as possible to improve the transmission of light to and from the optical fiber held by the connector. Such contaminants which might adversely impact the transmission of light to and from the optical fiber include but are not limited to dust and finger prints.

Dust caps may be provided for connectors to protect the polished end face of the optical fiber. However, when such dust caps are in place, the connector is not capable of being received in known optical fiber adapters, such as those described in U.S. Pat. No. 5,317,663, and U.S. Pat. No. 6,347,888. The disclosures of these patents are incorporated herein by reference. A connector may be inserted into one of these known adapters for storage or pre-wiring of a cross-connection point, an interconnection point or some other type telecommunications switching or connection equipment with the dust cap removed. While the adapters might provide some protection from contaminants to a single connector inserted into an adapter, these adapters are not as effective as a dust cap in protecting the polished end face.

It is desirable to improve the known methods and apparatus for protecting the polished end face of a fiber optic connector within telecommunications equipment.

SUMMARY OF THE INVENTION

The present invention relates to a fiber optic connector holder sized to fit within an opening for mounting a fiber optic adapter. The fiber optic connector holder is configured to permit a fiber optic connector with a dust cap positioned about a ferrule and a polished end face of an optical fiber held by the ferrule to be inserted within and releasably held by the connector holder.

The present invention further relates to a system for holding fiber optic connectors including a fiber optic connector holder mounted within an opening in a bulkhead for mounting a fiber optic adapter. The fiber optic connector holder is configured to receive a fiber optic connector with a dust cap mounted about a ferrule and polished end face of an optical fiber held by the ferrule. The connector holder may be removed from the bulkhead and a fiber optic adapter may be mounted within the same opening.

The present invention also relates to a method of holding an optical fiber connector to a bulkhead, when the fiber optic connector includes a dust cap mounted about a ferrule and a polished end face of an optical fiber held by the ferrule.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 1 is a first perspective view of a fiber optic connector holder according to the present invention.

FIG. 2 is a second perspective view of the fiber optic connector holder of FIG. 1.

FIG. 3 is a top view of the fiber optic connector holder of FIG. 1.

FIG. 4 is a bottom view of the fiber optic connector holder of FIG. 1.

FIG. 5 is a first end view of the fiber optic connector holder of FIG. 1.

FIG. 6 is a side view of the fiber optic connector holder of FIG. 1.

FIG, 7 is a second opposite end view of the fiber optic connector holder of FIG. 1.

FIG. 8 is a first perspective view of system for holder a fiber optic connector including the fiber optic connector holder of FIG. 1 with a fiber optic connector inserted.

FIG. 9 is a second perspective view of the system for holding a fiber optic connector of FIG. 8.

FIG. 10 is a top view of the system for holding a fiber optic connector of FIG. 8.

FIG. 11 is a side view of the system for holding a fiber optic connector of FIG. 8.

FIG. 12 is an end view of the system for holding a fiber optic connector of FIG. 8.

FIG. 13 is a cross-sectional view of the system for holding a fiber optic connector of FIG. 8, taken along line A—A in FIG. 11.

FIG. 14 is an exploded perspective view of the system for holding a fiber optic connector of FIG. 8.

Figure 15:
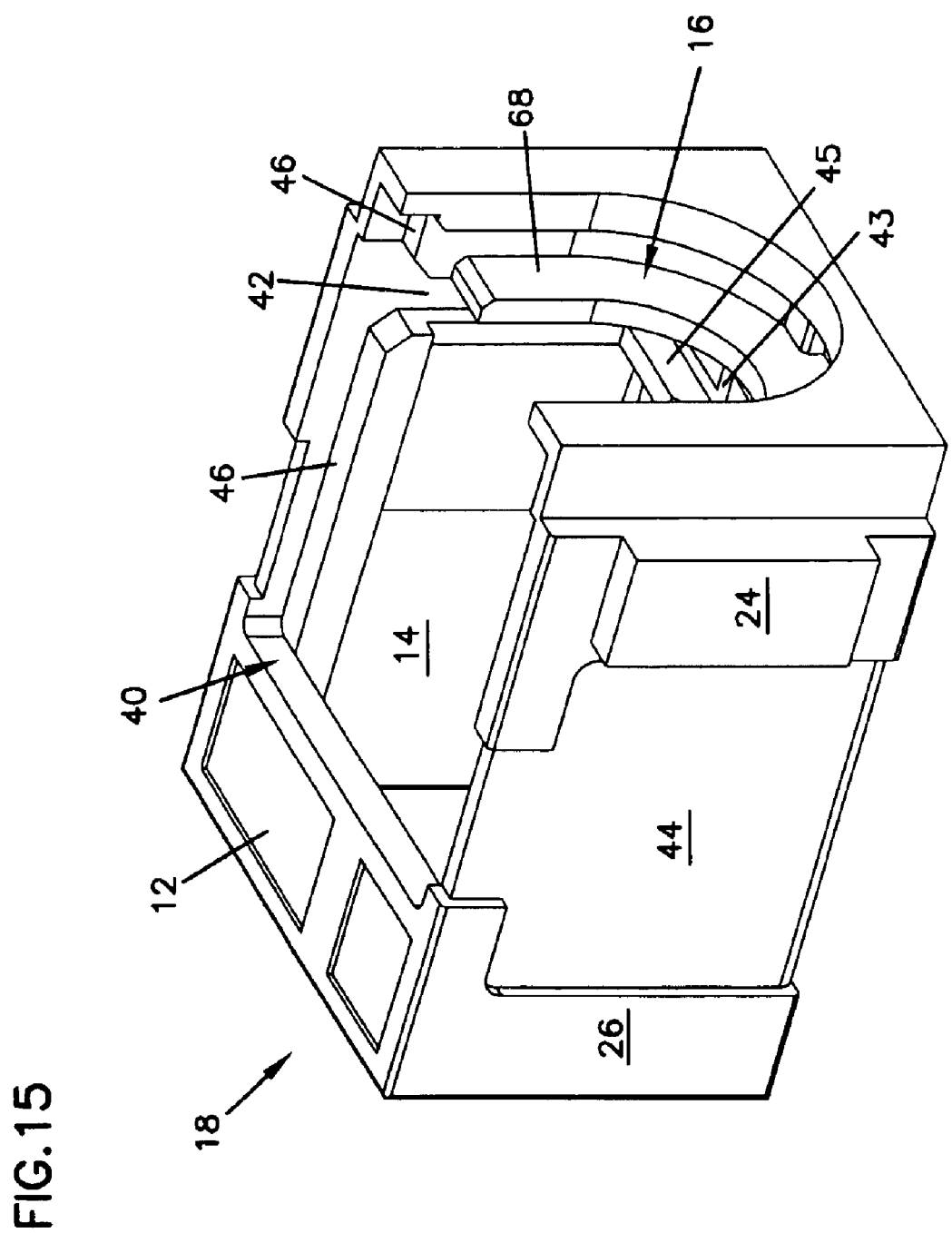

FIG. 15 is a perspective view of the main housing of the fiber optic connector holder of FIG. 1.

FIG. 16 is a first perspective view of an inner housing of the fiber optic connector holder of FIG. 1.

FIG. 17 is a second perspective view of the inner housing of FIG. 16.

FIG. 18 is a top view of the inner housing of FIG. 16.

FIG. 19 is a side view of the inner housing of FIG. 16.

FIG. 20 is a first end view of the inner housing of FIG. 16.

FIG. 21 is a second end view of the inner housing of FIG. 16.

FIG. 22 is a first perspective view of the cover of the fiber optic connector holder of FIG. 1.

FIG. 23 is a second perspective view of the cover of FIG. 22.

FIG. 24 is a top view of the cover of FIG. 22.

FIG. 25 is a side view of the cover of FIG. 22.

FIG. 26 is a bottom view of the cover of FIG. 22.

FIG. 27 is a first end view of the cover of FIG. 22.

FIG. 28 is a second end view of the cover of FIG. 22.

FIG. 29 is a perspective view of the clip of the fiber optic connector holder of FIG. 1.

FIG. 30 is an end view of the clip of FIG. 29.

FIG. 31 is a side view of the clip of FIG. 29.

FIG. 32 is a bottom view of the clip of FIG. 29.

Figure 33:
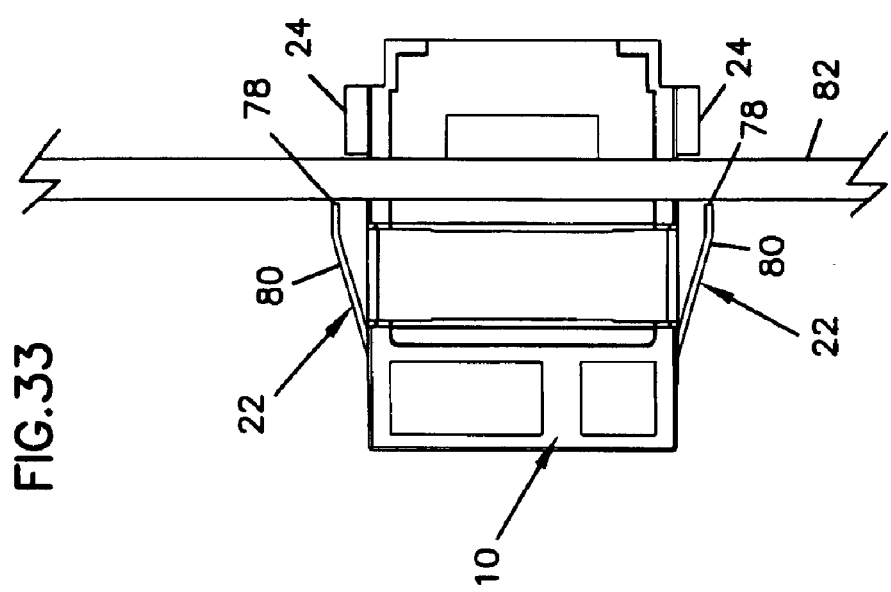

FIG. 33 is a top view of the fiber optic connector holder of FIG. 1 inserted within an opening in a bulkhead.

Figure 34:
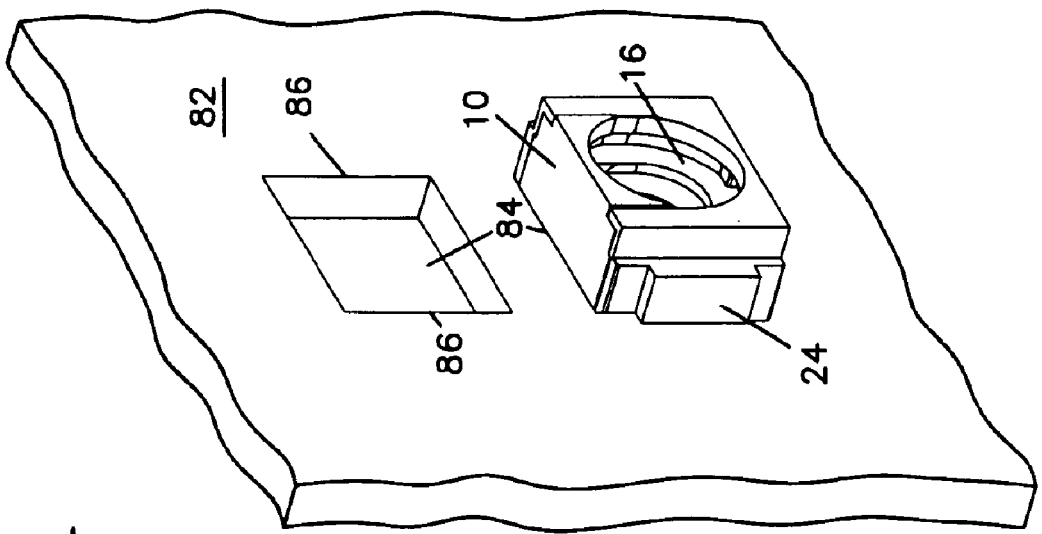

FIG. 34 is a perspective view of a bulkhead including a plurality of openings for receiving fiber optic connector adapters and the fiber optic connector holder of FIG. 1 inserted within one of the openings.

FIG. 35 is a perspective view of the dust cap of the fiber optic connector of FIG. 14.

FIG. 36 is a side view of the dust cap of FIG. 35.

FIG. 37 is an end view of the dust cap of FIG. 35.

FIG. 38 is a cross-sectional view of the dust cap of FIG. 35.

DETAILED DESCRIPTION OF THE PREFERRED EMBODIMENTS

Reference will now be made in detail to exemplary aspects of the present invention which are illustrated in the accompanying drawings. Wherever possible, the same reference numbers will be used throughout the drawings to refer to the same or similar parts.

Fiber optic cables may be terminated with fiber optic connectors such as connector 100 shown in FIGS. 8 through 14, below. Optical fiber within these cables may be terminated at a polished end face held by a ferrule 102 in connector 100, as is well known in the art and shown in U.S. Pat. No. 5,317,663, incorporated herein by reference. These polished end faces and ferrules 102 need to be stored and protected until needed for connecting to other fiber optic cables or optical signal equipment.

Often a dust cap 104 may be placed about ferrule 102 and the polished end face of the optical fiber to protect the polished end face from contamination from dust, fingerprints or other items which might degrade optical signal transmission. While it is known to store these in known optical fiber adapters until the fiber within the attached cable is needed to connect to another fiber optic cable ot optical signal equipment, such storage is less than ideal as adapters do not seal the polished end face from contamination as well as dust cap 104 securely fit and held about ferrule 102 of connector 100. Known adapters do not permit insertion of connector 100 which still has dust cap 104 in place about ferrule 102 and the polished end face of the cable.

Referring now to FIGS. 1 and 2, connector holder 10 includes a main housing 12 defining an interior cavity 14. An open end 18 permits insertion of a connector 100 into cavity 14 while an opposite opening 16 permits dust cap 104 to protrude from connector holder 10. A clip 20 is positioned about main housing 12 and includes a pair of spring mounting clips 22. A pair of flanges 24 extends from opposing sides 26 of main housing 12 adjacent spring clips 22. Clips 22 and flanges 24 cooperate to releasably mount holder 10 to an opening in a bulkhead as is shown below.

Main housing 12 also includes a bottom 30 with a keyway 28 to to receive a keyed extension of connector 100 to consistently orient connector 100 for insertion into cavity 14. Opposite bottom 30 is an open top closed a cover 32. This is shown in more detail in FIG. 12, below. FIGS. 3 through 7 provide additional views of connector holder 10.

Referring now to FIGS. 8 through 13, connector 10 is shown with connector 100 positioned within cavity 18. Dust cap 104 extends from opening 16 of connector holder 10 while connector 100 is inserted through open end 14.

Referring now to FIGS. 13 and 14, connector holder 10 further includes an inner housing 34 with a pair of opposing releasable catches 36 and an opening 38 sized to receive dust cap 104. Inner housing 34 is positioned within main housing 12 through an open top 40 with opening 38 adjacent opening 16 and catches 36 adjacent open end 14. Cover 32 is then positioned within open top 40 and clip 20 placed about cover 32 and main housing 12. Cover 32 may be sealed within open top 40 by gluing, ultrasonic welding or a variety of known fastening techniques. Connector 100 includes a pair of opposing recesses 106 which receive catches 36 when connector 100 is inserted within holder 10.

As shown, connector 100 and holder 10 are SC style. Connector 100 and holder 10 may conform to other styles and formats of electrical connectors and adapters without straying from the spirit of the present invention.

Referring now to FIG. 15, main housing 12 also includes a slot 42 along both sides of cavity 14 to receiving and positioning a flange of inner housing 34 within cavity 14. A recess 44 is provided along sides 26 to receive clip 20. Open top 40 includes a ledge 46 upon which cover 32 is positioned to close cavity 14. An outer bulkhead 68 forms a portion of opening 16. An inner bulkhead 45 is positioned spaced apart from outer bulkhead 68 and these bulkheads cooperate to define slot 42. Between bulkheads 45 and 68 is a positioning surface 43 defining the bottom of slot 42.

Referring now to FIGS. 16 to 21, inner housing 34 includes a pair of clip arms 48 extending from a cross piece 50. Opening 38 for receiving dust cap 104 of connector 100 is in cross piece 50. Catches 36 are at the end of clip arms 48 opposite cross piece 50. Cross piece 50 includes a pair of flanges 52 which are received in slots 42 in main housing 12. As shown in FIG. 18, catches 36 include a ramped portion 54 which is engaged by connector 100 as connector 100 is inserted within cavity 14 through open end 18 of connector holder 10. Clip arms 48 are deflected outward allowing connector 100 to pass between catches 36. When connector 100 is fully inserted within cavity 14 (as shown in FIG. 13) catches 36 are received within recesses 106 and a retaining surface 56 of each catch 36 hold connector 100 within cavity 14.

Inner housing 34 is configured to permit insertion within slots 42 of cavity 14 of main housing 12 in either of two orientations. A pair of edges 66 of cross piece 50 properly position inner housing within cavity 14 with regard to cover 32 and main housing 12 so that opening 38 is aligned to receive dust cap 104.

Referring now to FIGS. 22 to 28, cover 32 includes a recess 58 for receiving clip 20 along an outer surface 68. Also in outer surface 68 is a recess 72 for receiving indicia. Along an inner surface 70 are formed a pair of edges 64 configured to be received upon ledges 46 of main housing 12. Extending from inner surface 70 is an outer flange 60 which cooperates with bulkhead 68 within main housing 12 to define opening 16. Also extending from inner surface 70 is a inner flange 62 which is spaced apart from outer flange 60 to form a slot 63. Slot 63 cooperates within slot 42 of main housing 12 to receive flanges 52 of inner housing 34.

At the top of slot 63 is a positioning surface 61 which cooperates with one of edges 66 of inner housing 34 to position inner housing 34 within cavity 14 so that opening 38 of inner housing 34 is aligned with opening 16. When assembled as connector holder 10, positioning surface 43 of main housing 12 and positioning surface 61 of cover 32 cooperate to engage both edges 66 of inner housing 34. Slot 42 of main housing 12 and slot 63 of cover 32 cooperate to capture flanges 52 of inner housing 34.

Referring now to FIGS. 29 to 32, clip 20 includes a cross piece 74 and a pair of opposing sides 76. Spring clips 22 are formed in sides 76. Sides 76 are received within recesses 44 of main housing 12 and cross piece 74 is received within recess 58 of cover 32. It is anticipated that clip 20 will be made of a resilient deformable metal to facilitate insertion and removal from an opening in a bulkhead. Spring clips 22 each include an end 78 and a ramped surface 80.

FIGS. 33 and 34 shows fiber optic connector holder 10 inserted within an opening 84 in a bulkhead 82. Bulkhead 82 may be part of a piece of telecommunications switching equipment such as a panel for making a plurality of connections between optical fiber cables including a plurality of openings 84 for adapters, as shown in FIG. 34. Alternatively, bulkhead 82 may include only a single opening 84 where only a single fiber optic connector holder 10 is needed.

Open end 18 of connector holder 10 is inserted through opening 84 until a pair of sides 86 of opening 84 engage ramped surfaces 80 of spring clips 22. Continued insertion of connector holder 10 will cause bulkhead sides 86 to deflect spring clips 22 inward toward sides 26. Bulkhead sides 86 will eventually pass beyond ends 78 of spring clips 22. Spring clips 22 will then spring back as shown in FIG. 34, capturing bulkhead sides 86 between ends 78 and flanges 24. Connector holder 10 may be removed from opening 84 by compressing spring clips 22 and removing in a direction opposite the insertion described above.

Alternatively, flanges 24 may be configured to include a fastener opening so that connector holder 10 can be mounted within opening 84 by removable fasteners.

It is anticipated that bulkhead should be interpreted broadly enough to include a telecommunications installation where openings 84 for mounting adapters and connector holders are included into sliding adapter packs, such as described in commonly-owned U.S. Pat. No. 5,497,444. The disclosure of this patent is incorporated herein by reference. Bulkhead should also be interpreted broadly enough to include a single opening in a wall or panel, a face plate of a telecommunications module for cross-connecting or interconnecting multiple optical fiber cables, as well as other telecommunications installations where one or more adapters may be mounted within an opening 84.

Referring now to FIGS. 35 through 38, dust cap 104 includes a central opening 108 to receive ferrule 102 when ferrule 102 is inserted through open end 110. Opposite open end 110 is closed end 112 which includes knurling 114 to provide better grip for removing dust cap 104. Central opening 108 fits about ferrule 102 to provide a seal about ferrule 102 and to hold dust cap to connector 100. Due to the reduction of air volume within central opening 108 when ferrule 102 is inserted (see FIG. 13), one or more helix shaped recesses 116 are provided within central opening 108 along inner walls 118. Recesses 116 extend from adjacent closed end 112 to open end 110. Recesses 116 are small enough prevent entry of unwanted contaminants and still permit air displaced within central opening 108 to be expelled when ferrule 102 is inserted so that dust cap 104 may be fully seat to connector 100. Recesses 116 also allow air to pass into central opening 108 when dust cap 104 is withdrawn from ferrule 102. The shape of each recess 116 is also designed to allow passage of air into and out of central opening 108 when dust cap 104 is removed or placed on ferrule 102 while inhibiting the passage of contaminants along the same path.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic connector holder for holding a fiber optic connector with a dust cap mounted about a ferrule holding a polished end face of an optical fiber, the connector holder comprising:
   a main housing defining a cavity with an open end sized to receive the fiber optic connector and the dust cap, a top, a bottom and a pair of opposing sides;
   an inner housing disposed within the main housing and including a dust cap opening sized to receive the dust cap when the fiber optic connector is received in the open end of the main housing;
   the inner housing including at least one retaining clip which releasably latches onto the fiber optic connector and releasably holds the fiber optic connector within the open end of the main housing.

2. The fiber optic connector holder of claim 1, wherein the main housing is sized to fit within an opening in a bulkhead having the same footprint as an adapter for receiving and optically connecting a pair of the fiber optic connectors.

3. The fiber optic connector holder of claim 2, wherein an outer clip is fitted about the main housing and includes at least one releasable catch positioned along one of the sides of the main housing for engaging the opening in the bulkhead.

4. The fiber optic connector holder of claim 2, wherein the main housing includes a flange extending from at least one of the sides.

5. The fiber optic connector holder of claim 1, wherein the inner housing includes a pair of retaining clips which releasably engage recesses along the sides of the fiber optic connector when the fiber optic connector is received in the opening.

6. The fiber optic connector holder of claim 1, wherein the main housing includes an open top sized to permit the inner housing to be inserted within the cavity and a cover sized to fit within and close off the open top.

7. The fiber optic connector holder of claim 1, wherein the cover is a separate piece from the main housing and is attached to the main housing within the open top to hold the inner housing within the cavity.

8. The fiber optic connector holder of claim 1, wherein the dust cap extends outside of the main housing when the fiber optic connector is held by the retaining clips of the inner housing.

9. The fiber optic connector holder of claim 1, wherein the main housing does not include a second open end for receiving a second fiber optic connector.

10. A system for holding fiber optic connectors comprising:
   a bulkhead including a plurality of adapter openings sized to receive adapters configured to optically connect optical fiber cables within fiber optic connectors;
   at least one adapter mounted within one of the adapter openings in the bulkhead;
   at least one fiber optic connector holder mounted within one of the adapter openings in the bulkhead, the fiber optic connector holder including a housing with a central cavity having an open end sized to receive a fiber optic connector with a dust cap positioned about a ferrule holding a polished end face of an optical fiber, and retaining clips within the cavity to releasably hold the fiber optic connector and the dust cap within the cavity; and
   at least one fiber optic connector within the cavity of the fiber optic connector holder, the fiber optic connector having a dust cap positioned about the ferrule;
   wherein the fiber optic connector holder may be removed from the adapter opening and an adapter mounted within the same adapter opening.

11. The system of claim 10, wherein the fiber optic connector holder includes an outer clip positioned about the housing including at least one releasable catch to engage at least one side of the adapter opening in the bulkhead and releasably hold the connector holder within the adapter opening.

12. A method of holding a fiber optic connector comprising:
   providing a bulkhead with a plurality of adapter openings and a fiber optic connector holder mounted within one of the adapter openings, the fiber optic connector including a housing with a central cavity having an open end sized to receive a fiber optic connector with a dust cap and retaining clips within the cavity to releasably hold the fiber optic connector and the dust cap within the cavity;
   positioning a fiber optic cable terminated with a fiber optic connector including a ferrule and polished end face, and a dust cap releasably mounted about the polished end face and the ferrule so that the fiber optic connector is proximate the bulkhead; and
   inserting the fiber optic connector with the dust cap about the ferrule within the fiber optic connector holder so that the fiber optic connector engages the retaining clips within the cavity of the holder.

13. A fiber optic connector holder for holding a fiber optic connector with a dust cap mounted about a ferrule holding a polished end face of an optical fiber, the dust cap including a closed end that opposes the polished end face of the optical fiber when the dust cap is mounted about the ferrule, the connector holder comprising:
   a main housing defining a cavity with an open end sized to receive the fiber optic connector and the dust cap;
   an inner housing disposed within the main housing and including a dust cap opening sized to receive the dust cap when the fiber optic connector is received in the open end of the main housing;
   the inner housing including at least one retaining arrangement which releasably holds the fiber optic connector within the open end of the main housing.

14. The fiber optic connector holder of claim 13, wherein the main housing is sized to fit within an opening in a bulkhead having the same footprint as an adapter for receiving and optically connecting a pair of the fiber optic connectors.

15. The fiber optic connector holder of claim 14, wherein an outer clip is fitted about the main housing and includes at least one releasable catch positioned along one of the sides of the main housing for engaging the opening in the bulkhead.

16. The fiber optic connector holder of claim 14, wherein the main housing includes a flange extending from at least one of the sides.

17. The fiber optic connector holder of claim 13, wherein the retaining arrangement of the inner housing includes a pair of retaining clips which releasably engage recesses along the sides of the fiber optic connector when the fiber optic connector is received in the opening.

18. The fiber optic connector holder of claim 13, wherein the dust cap extends outside of the main housing when the fiber optic connector is held by the retaining clips of the inner housing.

19. The fiber optic connector holder of claim 13, wherein the main housing does not include a second open end for receiving a second fiber optic connector.

20. A system for holding fiber optic connectors comprising:
   a bulkhead including a plurality of openings;
   a plurality of fiber optic connector holders each mounted within one of the openings in the bulkhead, the fiber optic connector holder including a housing with a central cavity having an open end sized to receive a fiber optic connector with a dust cap positioned about a ferrule holding a polished end face of an optical fiber, and a retaining arrangement within the cavity to releasably hold the fiber optic connector and the dust cap within the cavity; and
   at least one fiber optic connector within the cavity of the fiber optic connector holders, the fiber optic connector having a dust cap positioned about the ferrule; the ferrule holding an optical fiber having a polished end face, the dust cap including an open end for receiving the ferrule and a closed end for protecting the polished end face of the optical fiber;
   wherein the fiber optic connector holder may be removed from the adapter opening and an adapter mounted within the same adapter opening.

21. The system of claim 20, wherein the retaining arrangement includes a retaining clip.

22. A method of holding a fiber optic connector comprising:
   providing a bulkhead with a plurality of fiber optic connector holders, the fiber optic connectors each including a housing with a central cavity having an open end sized to receive a fiber optic connector with a dust cap and a retaining arrangement within the cavity to releasably hold the fiber optic connector and the dust cap within the cavity;
   positioning a fiber optic cable terminated with a fiber optic connector so that the fiber optic connector is proximate the bulkhead, the fiber optic connector including a ferrule holding an optical fiber having a polished end face, and a dust cap releasably mounted about the polished end face and the ferrule, the dust cap including and open end for receiving the polished end face and the ferrule, the dust cap also including a closed end for protecting the polished end face and the ferrule; and
   inserting the fiber optic connector with the dust cap about the ferrule within one of the fiber optic connector holders so that the fiber optic connector engages the retaining arrangement within the cavity of the holder.

23. The method of claim 22, wherein the retaining arrangement includes a retaining clip.

24. A fiber optic connector holder and connector assembly comprising:
   a fiber optic connector including a ferrule and a dust cap mounted about the ferrule, the ferrule holding an optical fiber having a polished end, and the dust cap having a closed end covering the polished end of the optical fiber; and
   a connector holder including a main housing defining a cavity with an open end sized to receive the fiber optic connector and the dust cap, the connector holder further including an inner housing disposed within the main housing and including a dust cap opening sized to receive the dust cap when the fiber optic connector is received in the open end of the main housing, the inner housing including at least one retaining arrangement which releasably holds the fiber optic connector within the open end of the main housing;
   wherein the fiber optic connector is positioned within the main housing with the ferrule, the polished end of the optical fiber and the dust cap mounted about the ferrule positioned within the cavity.

25. A fiber optic connector holder and connector assembly comprising:
   a connector holder including a housing defining a cavity with an open end, a longitudinal axis of the housing, the ferrule holding and optical fiber having a polished end face, the connector including a dust cap positioned about the ferrule, a closed end of the dust cap covering the polished end face of the optical fiber, the ferrule and the dust cap positioned in the cavity, the connector removable from the cavity in a direction parallel to the longitudinal axis of the ferrule.

26. A fiber optic connector holder and connector assembly comprising:

a fiber optic connector including a connector body having a first and a second end, the fiber optic connector also including a ferrule positioned at the first end of the connector body, the ferrule having a side surface and an end surface, the ferrule holding an optical fiber having a polished end face positioned at the end surface of the ferrule;

a dust cap having an open end positioned opposite from a closed end, the dust cap including an inner surface defining a central opening that extends from the open end to the closed end of the dust cap, the dust cap being mounted on the ferrule of the fiber optic connector with the inner surface of the dust cap engaging the side surface of the ferrule and the closed end of the dust cap opposing the polished end face of the optical fiber; and a connector holder for holding the fiber optic connector without requiring the dust cap to be removed from the ferrule, the connector holder having a front side and a back side, the connector holder being sized and shaped to receive the first end of the connector body through the front side of the connector holder while the dust cap is mounted on the ferrule, wherein when the fiber optic optic connector is held by the connector holder, the connector holder blocks access to the first end of the connector body from the front side of the connector holder.

27. The fiber optic connector holder and connector assembly of claim 26, wherein when the fiber optic connector is held by the connector holder, the second end of the connector body projects outwardly from the connector holder in a forward direction.

28. The fiber optic connector holder and connector assembly of claim 26, wherein the ferrule of the fiber optic connector defines a longitudinal axis, and wherein the longitudinal axis is generally horizontal when the fiber optic connector is held by the connector holder.

29. A telecommunications assembly comprising:

a fiber optic connector including a connector body having a first end and a second end, the fiber optic connector also including a ferrule positioned at the first end of the connector body, the ferrule having a side surface and an end surface, the ferrule holding an optical fiber having a polished end face positioned at the end surface of the ferrule, the fiber optic connector also including a boot positioned at the second end of the connector body;

a dust cap having an open end positioned opposite from a closed end, the dust cap including an inner surface defining a central opening that extends from the open end to the closed end of the dust cap, the dust cap being mounted on the ferrule of the fiber optic connector with the inner surface of the dust cap engaging the side surface of the ferrule and the closed end of the dust cap opposing the polished end face of the optical fiber;

a bulkhead having a front side and a back side;

a connector holder mounted to the bulkhead for holding the fiber optic connector with the dust cap mounted on the ferrule, wherein when the fiber optic connector is held by the connector holder, the connector holder blocks access to the first end of the connector body from the front side of the bulkhead and the second end of the connector body projects outwardly from the connector holder in a forward direction so as to be accessible from the front side of the bulkhead.

30. The telecommunications assembly of claim 29, wherein the ferrule of the fiber optic connector defines a longitudinal axis, and wherein the longitudinal axis is generally perpendicular relative to the bulkhead when the fiber optic connector is held by the connector holder.

31. The telecommunications assembly of claim 29, wherein the ferrule of the fiber optic connector defines a longitudinal axis, and wherein the longitudinal axis is generally horizontal when the fiber optic connector is held by the connector holder.

* * * * *

UNITED STATES PATENT AND TRADEMARK OFFICE
CERTIFICATE OF CORRECTION

PATENT NO. : 7,198,409 B2
APPLICATION NO. : 10/610325
DATED : April 3, 2007
INVENTOR(S) : Smith et al.

It is certified that error appears in the above-identified patent and that said Letters Patent is hereby corrected as shown below:

Title page, (56) References Cited, Other Publications: insert --Drawings showing an ADC fiber storage trough concept (June 2002). Drawings showing another ADC fiber storage trough concept (April 2002). "Retainer Staright [sic] Removable SC," which shows a latch design, 2 pages (January 17, 2006).-- in appropriate order Col. 6, line 29, claim 7: "claim 1" should read --claim 6--

Col. 7, line 29, claim 13: "including" should read --defining--

Col. 7, line 31, claim 13: "received in" should read --inserted through--

Col. 7, line 56, claim 18: "clips" should read --arrangement--

Col. 7, line 65, claim 20: "the" should read --each-- (3rd occurrence)

Col. 8, line 20, claim 22: "connectors" should read --connector holders--

Col. 8, line 67, claim 25: "a longitudinal axis of the housing" should read --a longitudinal axis defined by the housing and extending from the open end into the cavity; and a fiber optic connector received in the open end and releasably mounted to the housing, the connector including a ferrule defining a longitudinal axis parallel to the longitudinal axis of the housing,--

UNITED STATES PATENT AND TRADEMARK OFFICE
CERTIFICATE OF CORRECTION

PATENT NO. : 7,198,409 B2
APPLICATION NO. : 10/610325
DATED : April 3, 2007
INVENTOR(S) : Smith et al.

It is certified that error appears in the above-identified patent and that said Letters Patent is hereby corrected as shown below:

Col. 9, line 1, claim 25: "and" should read --an--

Signed and Sealed this

Fifteenth Day of July, 2008

JON W. DUDAS
*Director of the United States Patent and Trademark Office*